US012297786B2

(12) United States Patent
Kim et al.

(10) Patent No.: US 12,297,786 B2
(45) Date of Patent: May 13, 2025

(54) SYSTEM FOR SUPPLYING VOC AS FUEL FOR ENGINE AND VESSEL USING VOC AS FUEL

(71) Applicant: Hanwha Ocean Co., Ltd., Geoje-Si (KR)

(72) Inventors: Jong Hyun Kim, Geoje-si (KR); Young Ho Bae, Geoje-si (KR)

(73) Assignee: Hanwha Ocean Co., Ltd., Geoje-si (KR)

( * ) Notice: Subject to any disclaimer, the term of this patent is extended or adjusted under 35 U.S.C. 154(b) by 0 days.

(21) Appl. No.: 18/575,624

(22) PCT Filed: Aug. 9, 2023

(86) PCT No.: PCT/KR2023/011753
§ 371 (c)(1),
(2) Date: Dec. 29, 2023

(87) PCT Pub. No.: WO2024/035115
PCT Pub. Date: Feb. 15, 2024

(65) Prior Publication Data

US 2025/0075666 A1 Mar. 6, 2025

(30) Foreign Application Priority Data

Aug. 9, 2022 (KR) ........................ 10-2022-0099439
Aug. 8, 2023 (KR) ........................ 10-2023-0103578

(51) Int. Cl.
*F02D 19/06* (2006.01)
*B63H 21/38* (2006.01)

(52) U.S. Cl.
CPC ......... *F02D 19/0657* (2013.01); *B63H 21/38* (2013.01); *F02D 19/0671* (2013.01)

(58) Field of Classification Search
CPC .. F02D 19/0657; F02D 19/0671; B63H 21/38
See application file for complete search history.

(56) References Cited

FOREIGN PATENT DOCUMENTS

KR 10-2012-0136196 A 12/2012
KR 10-2013-0077560 A 7/2013
(Continued)

OTHER PUBLICATIONS

International Search Report dated Nov. 7, 2023 in PCT Application No. PCT/KR2023/011753.
(Continued)

*Primary Examiner* — Jacob M Amick
*Assistant Examiner* — Charles J Brauch
(74) *Attorney, Agent, or Firm* — Knobbe, Martens, Olson & Bear, LLP

(57) ABSTRACT

A VOC fuel supply system and method for supplying volatile organic compounds (VOCs) as fuel of an engine and a vessel using VOCs as fuel. The VOC fuel supply system includes: an engine operable in a gas fuel mode using a gas as fuel; a VOC supply unit supplying VOCs (Volatile Organic Compounds) as fuel to the engine; a fuel supply line connecting the VOC supply unit to the engine and defining a path for transfer of a gaseous VOC fuel from the VOC supply unit to the engine; and a drain filter provided to the fuel supply line upstream of the engine and filtering out recondensed liquid VOCs contained in the VOC fuel.

15 Claims, 5 Drawing Sheets

(56) References Cited

FOREIGN PATENT DOCUMENTS

| | | | | | |
|---|---|---|---|---|---|
| KR | 10-2017-0044417 | A | | 4/2017 | |
| KR | 2019090677 | A | * | 8/2019 | ............ B63B 25/08 |
| KR | 10-2019-0127020 | A | | 11/2019 | |
| KR | 10-2020-0081545 | A | | 7/2020 | |
| KR | 10-2232229 | B1 | | 3/2021 | |
| KR | 102232229 | B | * | 3/2021 | |
| KR | 10-2023-0012261 | A | | 1/2023 | |
| KR | 20230012261 | A | * | 1/2023 | |

OTHER PUBLICATIONS

Office Action issued in Korean Application No. KR 2022-0099439 dated Mar. 21, 2024.

* cited by examiner

SYSTEM FOR SUPPLYING VOC AS FUEL FOR ENGINE AND VESSEL USING VOC AS FUEL

TECHNICAL FIELD

The present invention relates to a VOC fuel supply system and method for supplying volatile organic compounds (VOCs) as fuel for engines and a vessel using VOCs as fuel.

BACKGROUND ART

Volatile organic compounds (VOCs) are gases produced by volatilization of liquid oil in crude oil storage tanks, which are provided to oil tankers and store crude oil as cargo, or in fuel oil storage tanks, which store fuel oil used as fuel for engines.

The composition of VOCs may include almost all components of oil stored in a storage tank, that is, organic compounds. When released into the atmosphere, VOCs perform photochemical reaction with nitrogen oxides under sunlight to produce ozone and photochemical oxidants, causing environmental pollution, such as photochemical smog, ozone depletion, contribution to the greenhouse effect, and the like. Moreover, substances such as benzene are carcinogenic and very harmful to humans.

Due to the hazardous nature of VOCs, the International Maritime Organization and others have imposed some restrictions on VOC emissions from ports. Furthermore, since the release of VOCs into the atmosphere means a loss of active substances, it is necessary to find ways to recover and effectively treat VOCs rather than the release of VOCs into the atmosphere. Recently, research has also been conducted to improve energy efficiency of vessels through application of technology for recycling VOCs into fuel oil.

Since VOCs have a high content of heavy hydrocarbons and cannot meet the methane number of gas engines, a reformer has been typically used to convert VOCs into methane, which is a lighter hydrocarbon, for fuel supply.

For fuel supply using a reformer, there are needs for periodic maintenance to maintain performance of the reformer and additional fuel combustion to allow reforming reaction, which requires heat energy, such as a large amount of steam and the like.

DISCLOSURE

Technical Tasks

Therefore, the present invention is aimed at addressing the above problems and it is an aspect of the present invention to provide a VOC fuel supply system and method that can stably supply VOCs as fuel for engines, and a vessel using VOCs as fuel.

Technical Solution

In accordance with one aspect of the present invention, there is provided a VOC fuel supply system including: an engine capable of using a gas as fuel; a VOC supply unit supplying volatile organic compounds (VOCs) as fuel to the engine; a fuel supply line connecting the VOC supply unit to the engine and defining a path for transfer of a gaseous VOC fuel from the VOC supply unit to the engine; and a drain filter provided to the fuel supply line and filtering out recondensed liquid VOCs contained in the VOC fuel upstream of the engine.

The drain filter may include: a funnel-shaped hopper disposed at a lower portion of the drain filter; and a gas inlet pipe disposed at an upper portion of the drain filter and extending at one end thereof from the fuel supply line and bent at the other end thereof towards the hopper to introduce the VOC fuel into the drain filter, and the recondensed liquid VOCs contained in the VOC fuel may be collected under the hopper and only the gaseous VOC fuel with the recondensed liquid VOCs separated therefrom is discharged.

The VOC fuel supply system may further include: a gas supply unit supplying a gas fuel having a higher calorific value than the VOCs to the engine; and a fuel mixing unit supplying a mixed gas fuel of the gas fuel supplied from the gas supply unit and the VOC fuel supplied from the VOC supply unit to the engine, wherein the engine receive the mixed gas fuel as the gas fuel.

The VOC fuel supply system may further include a recondensed-VOC recycling unit recovering the recondensed liquid VOCs collected in the drain filter.

The recondensed-VOC recycling unit may further include: a fuel temperature measurement unit provided to the fuel supply line upstream of the drain filter and measuring a temperature of the gas fuel supplied to the engine; and a controller interrupting operation of the VOC supply unit when a temperature measurement value measured by the fuel temperature measurement unit becomes lower than a preset temperature.

The recondensed-VOC recycling unit may include: a level measurement unit measuring a liquid level in the drain filter; a filter blocking valve blocking a fluid flow from the drain filter to the engine; a venting valve venting the gas fuel from between the filter blocking valve and the engine and from the engine; and a controller interrupting operation of the VOC supply unit and closing the filter blocking valve while opening the venting valve, when a liquid level measurement value of the level measurement unit reaches a preset level.

The recondensed-VOC recycling unit may include: an LVOC recovery valve discharging the recondensed liquid VOCs collected in the drain filter; an LVOC recovery tank storing the recondensed liquid VOCs discharged from the drain filter; and an LVOC transfer pump supplying the recondensed liquid VOCs stored in the LVOC recovery tank to the VOC supply unit.

The recondensed-VOC recycling unit may further include an inert gas supply unit supplying an inert gas to the drain filter to discharge the recondensed liquid VOCs from the drain filter.

The recondensed-VOC recycling unit may include: a double blocking valve unit blocking a path between the VOC supply unit and the drain filter when the inert gas is supplied to the drain filter; a filter blocking valve blocking a path between the drain filter and the engine when the inert gas is supplied to the drain filter; a fuel pressure measurement unit measuring a pressure of a fluid supplied from the fuel supply line to the drain filter; an LVOC recovery valve discharging the recondensed liquid VOCs collected in the drain filter; and a controller opening the LVOC recovery valve when a pressure measurement value measured by the fuel pressure measurement unit reaches a preset pressure.

The double blocking valve unit may include: a valve regulating the pressure of the fluid passing through the double blocking valve unit, and the controller may regulate a pressure of the inert gas supplied to the drain filter by controlling an opening degree of the double blocking valve unit such that the pressure measurement value measured by the fuel pressure measurement unit does not exceed a preset pressure change rate.

In accordance with another aspect of the present invention, there is provided a vessel using VOCs as fuel and including the VOC supply system.

The vessel may include: an inert gas supply unit generating an inert gas and supplying the inert gas to an inert gas demand site in the vessel; an inert gas supply line connecting the inert gas supply unit to the fuel supply line; a purge blocking valve unit provided to the inert gas supply line and controlling flow of the inert gas into the fuel supply line; and a gas blocking valve unit provided to the fuel supply line upstream of a point, to which the inert gas supply line is connected, and controlling a fuel flow to the engine, wherein the drain filter is disposed downstream of the gas blocking valve unit, and recondensed VOCs collected in the drain filter are discharged from the drain filter by a pressure of the inert gas under control of the purging blocking valve unit and the gas blocking valve unit provided to the vessel.

The vessel may further include: an LVOC recovery tank arranged in an open space on an upper deck of the vessel and storing the recondensed VOCs discharged from the drain filter; and an LVOC transfer pump transferring the recondensed VOCs stored in the LVOC recovery tank to the VOC supply unit such that the recondensed VOCs are supplied as fuel for the engine.

In accordance with a further aspect of the present invention, there is provided a VOC fuel supply method including the steps of: producing a gaseous VOC fuel by regulating a temperature and pressure of volatile organic compounds (VOCs) to temperature and pressure conditions for an engine; passing the gaseous VOC fuel through a drain filter prior to supplying the gaseous VOC fuel to the engine; and supplying the gaseous VOC fuel having passed through the drain filter to the engine, wherein, by the step of passing the gaseous VOC fuel through the drain filter, recondensed liquid VOCs having condensed while the gaseous VOC fuel is supplied to the engine are separated from the gaseous VOC fuel to allow only the gaseous VOC fuel to be supplied to the engine.

The step of producing a gaseous VOC fuel may include: mixing the VOCs with a gas fuel having a higher calorific value than the VOCs to produce a mixed gas fuel.

The method may further include: discharging the recondensed liquid VOCs separated from the drain filter; and recycling the discharged recondensed VOCs to feed the step of producing a gaseous VOC fuel.

The step of discharging the recondensed VOCs may include measuring a temperature of the gaseous VOC fuel upstream of the drain filter; and interrupting the step of producing a gaseous VOC fuel prior to discharge of the recondensed VOCs when the measured temperature of the gaseous VOC fuel is lower than a preset temperature.

The step of discharging the recondensed VOCs may include: measuring a liquid level in the drain filter; and interrupting feeding the engine prior to discharge of the recondensed VOCs, followed by venting the gaseous VOC fuel from the drain filter and the engine, when the measured liquid level reaches a preset level.

The step of discharging the recondensed VOCs may include: blocking upstream and downstream of the drain filter; and supplying an inert gas to the upstream and downstream blocked drain filter to allow the recondensed VOCs to be discharged from the drain filter by a pressure of the inert gas.

The step of supplying an inert gas may further include: measuring a pressure upstream of the drain filter; and supplying the inert gas while regulating the pressure of the inert gas such that the measured pressure does not exceed a preset pressure change rate.

In accordance with yet another aspect of the present invention, there is provided a VOC fuel supply system including: an engine operable in a gas fuel mode using a gas as fuel; a VOC supply unit supplying volatile organic compounds (VOC) as fuel to the engine; a fuel supply line connecting the VOC supply unit to the engine and transferring a gaseous VOC fuel from the VOC supply unit to the engine; a cooling line in which a heat medium is circulated by cool the fuel supply line so as to condense gaseous VOCs remaining in the fuel supply line; a cooling valve provided to the cooling line; and a controller controlling the cooling valve to be open when the gas fuel mode is interrupted.

The VOC fuel supply system may further include: a reductant tank storing a reductant for denitrifying exhaust gases discharged from the engine; and a chiller unit circulating a heat medium for maintaining a temperature of the reductant tank, wherein the cooling line branches off from a line, along which the heat medium having an increased temperature while cooling the reductant tank is recirculated to the chiller unit, and is connected to a distal end of the fuel supply line.

The VOC fuel supply system may further include: an inert gas supply unit supplying an inert gas to the fuel supply line to discharge liquid LVOCs remaining in the fuel supply line; an LVOC purging line connecting the inert gas supply unit to the fuel supply line; an LVOC purging valve provided to the LVOC purging line; and a purging temperature measurement unit measuring a temperature of the fuel supply line, wherein the controller opens the LVOC purging valve to allow the inert gas to be supplied to the fuel supply line so as to allow the LVOCs to be discharged from the fuel supply line by the inert gas, when a temperature measurement value measured by the purging temperature measurement unit reaches a preset value.

The VOC fuel supply system may further include: a drain filter temporarily storing the inert gas and the LVOCs discharged from the fuel supply line; a fourth venting line transferring a gas discharged from the drain filter; a VOC venting valve provided to the fourth venting line; an LVOC recovery line transferring a liquid discharged from the drain filter; an LVOC recovery valve provided to the LVOC recovery line; and a fuel pressure measurement unit measuring a pressure in the fuel supply line, wherein the controller opens the VOC venting valve and the LVOC recovery valve when a pressure measurement value measured by the fuel pressure measurement unit reaches a preset value.

The drain filter may include: a funnel-shaped hopper disposed at a lower portion of the drain filter; and a gas inlet pipe disposed at an upper portion of the drain filter and extending at one end thereof from the fuel supply line and bent at the other end thereof towards the hopper to introduce the VOC fuel into the drain filter, and recondensed liquid VOCs contained in the VOC fuel are collected under the hopper and only the gaseous VOC fuel with the recondensed VOCs separated therefrom is discharged.

The VOC fuel supply system may further include: an LVOC recovery tank storing LVOCs discharged through the LVOC recovery line; and an LVOC transfer pump supplying recondensed VOCs stored in the LVOC recovery tank to the VOC supply unit.

The VOC fuel supply system may further include: a fuel temperature measurement unit measuring a temperature of the gas fuel supplied to the engine, wherein the controller interrupts operation of the VOC supply unit when a temperature measurement value measured by the fuel temperature measurement unit is lower than a preset temperature.

In accordance with yet another aspect of the present invention, there is provided a vessel using VOCs as fuel and including the VOC fuel supply system.

In accordance with yet another aspect of the present invention, there is provided a VOC fuel supply method including: operating an engine in a gas fuel mode in which volatile organic compounds (VOCs) are supplied as a gas fuel to the engine; blocking a fuel supply line transferring the gas fuel to the engine, when the gas fuel mode is interrupted; and supplying a heat medium to the fuel supply line to condense VOCs remaining in a gaseous state in the fuel supply line.

The method may further include: measuring a temperature of the fuel supply line; and supplying an inert gas to the fuel supply line to collect LVOCs in a drain filter by discharging the LVOCs from the fuel supply line, when the temperature of the fuel supply line reaches a preset value.

The method may further include: measuring a pressure of the fuel supply line; discharging a gas from the drain filter when the pressure of the fuel supply line reaches a preset value; and discharging a liquid from the drain filter to store the liquid in an LVOC recovery tank, when the pressure of the fuel supply line reaches a preset value, and the LVOCs stored in the LVOC recovery tank is used as fuel for the engine.

Advantageous Effects

A VOC fuel supply system and method according to the present invention and a vessel using VOCs as fuel can prevent environmental pollution using VOCs as fuel for engines without releasing the VOCs into the atmosphere and can improve energy efficiency of the vessel.

Upon supply of VOCs as fuel for engines, compression of VOCs to meet pressure requirements for the engines raises a dew point of VOCs to allow the VOCs to be condensed at room temperature. However, when condensed VOCs in a liquid state are introduced into an engine operable in a gas fuel mode, the condensed liquid VOCs can cause problems with engine combustion. The present invention can safely separate the condensed liquid VOCs from a gas fuel before the condensed liquid VOCs are supplied to the engine and can prevent problems caused by supply of the condensed liquid VOCs to the engine that operates in the gas fuel mode.

In addition, the system and method according to the present invention can recycle liquid VOCs as fuel for engines by cooling and recovering VOCs remaining in a gaseous state in piping upon interruption of the gas fuel mode or upon switching of the gas fuel mode to another fuel mode.

Further, the system and method according to the present invention can recycle VOCs in a liquid state as fuel for engines by recovering the liquid VOCs separated from a gas fuel before the liquid VOCs are supplied to an engine.

Furthermore, the system and method according to the present invention enable simplification of VOC recovery/recycling processes and equipment configuration by taking full advantage of existing components essential to a fuel supply system of a vessel or an engine.

EMBODIMENTS

Figure 1:
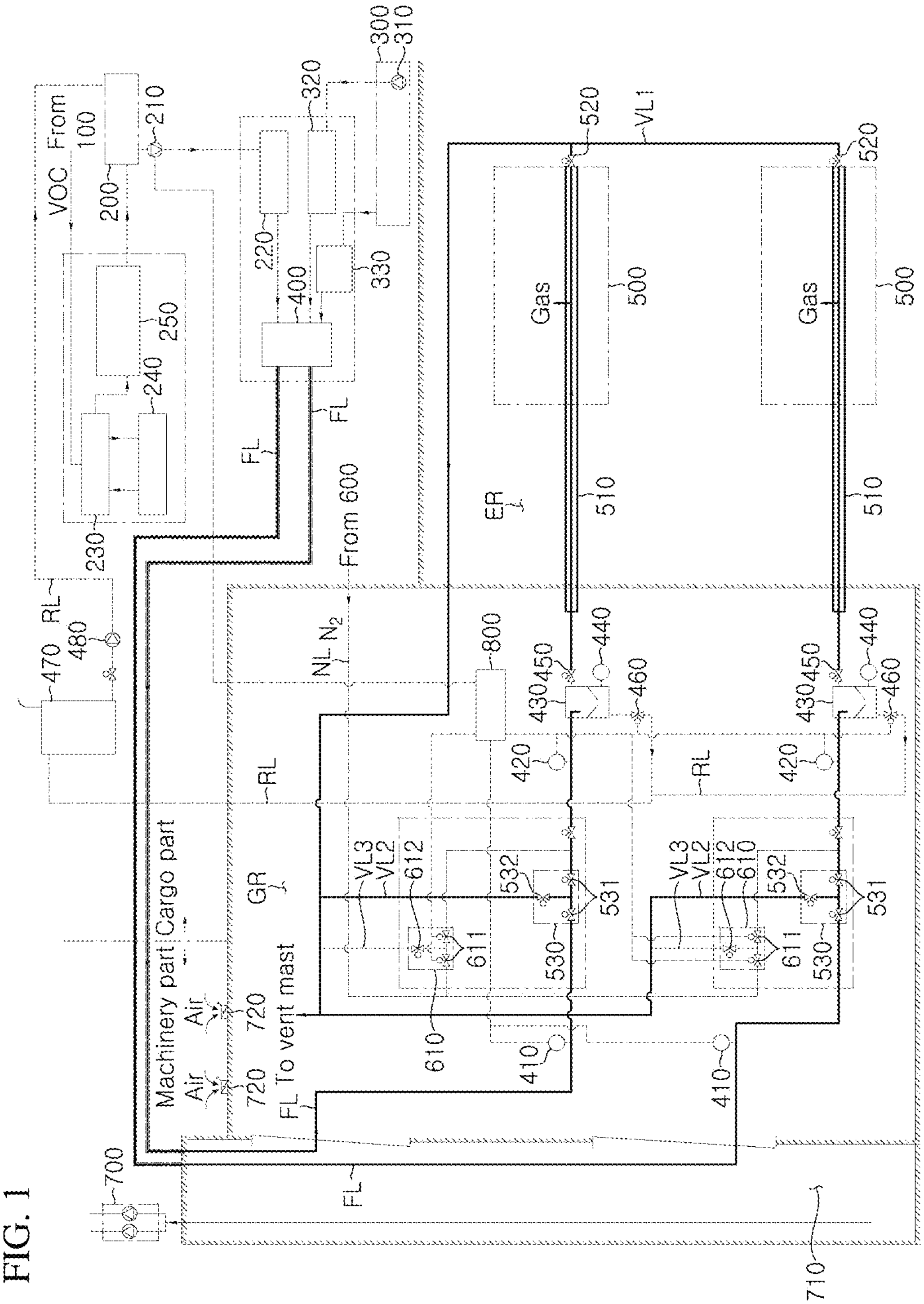
FIG. 1 is a schematic partial view of a vessel provided with a VOC fuel supply system according to a first embodiment of the present invention.
Figure 2:
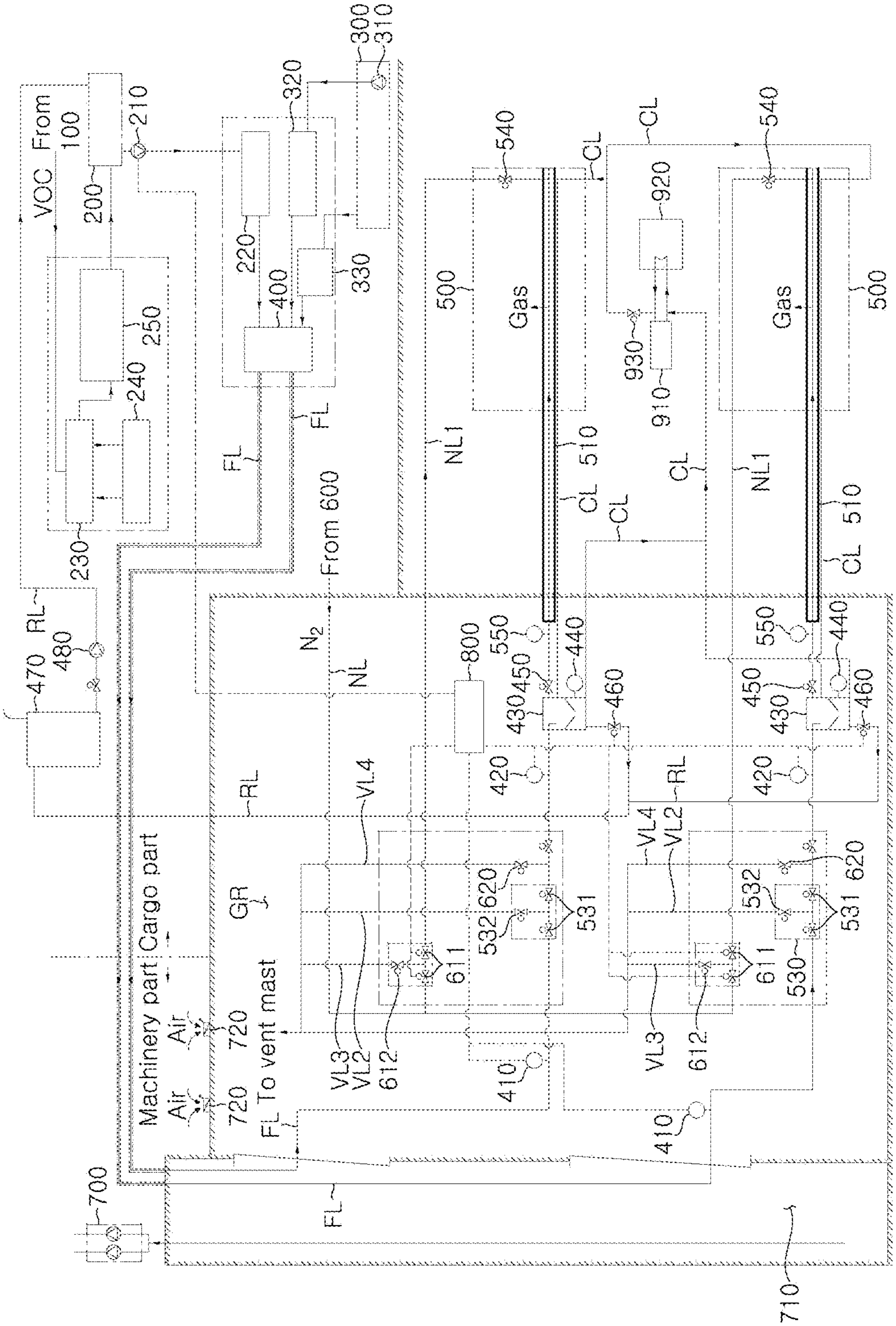
FIG. 2 is a schematic partial view of a vessel provided with a VOC fuel supply system according to a second embodiment of the present invention.
Figure 3:
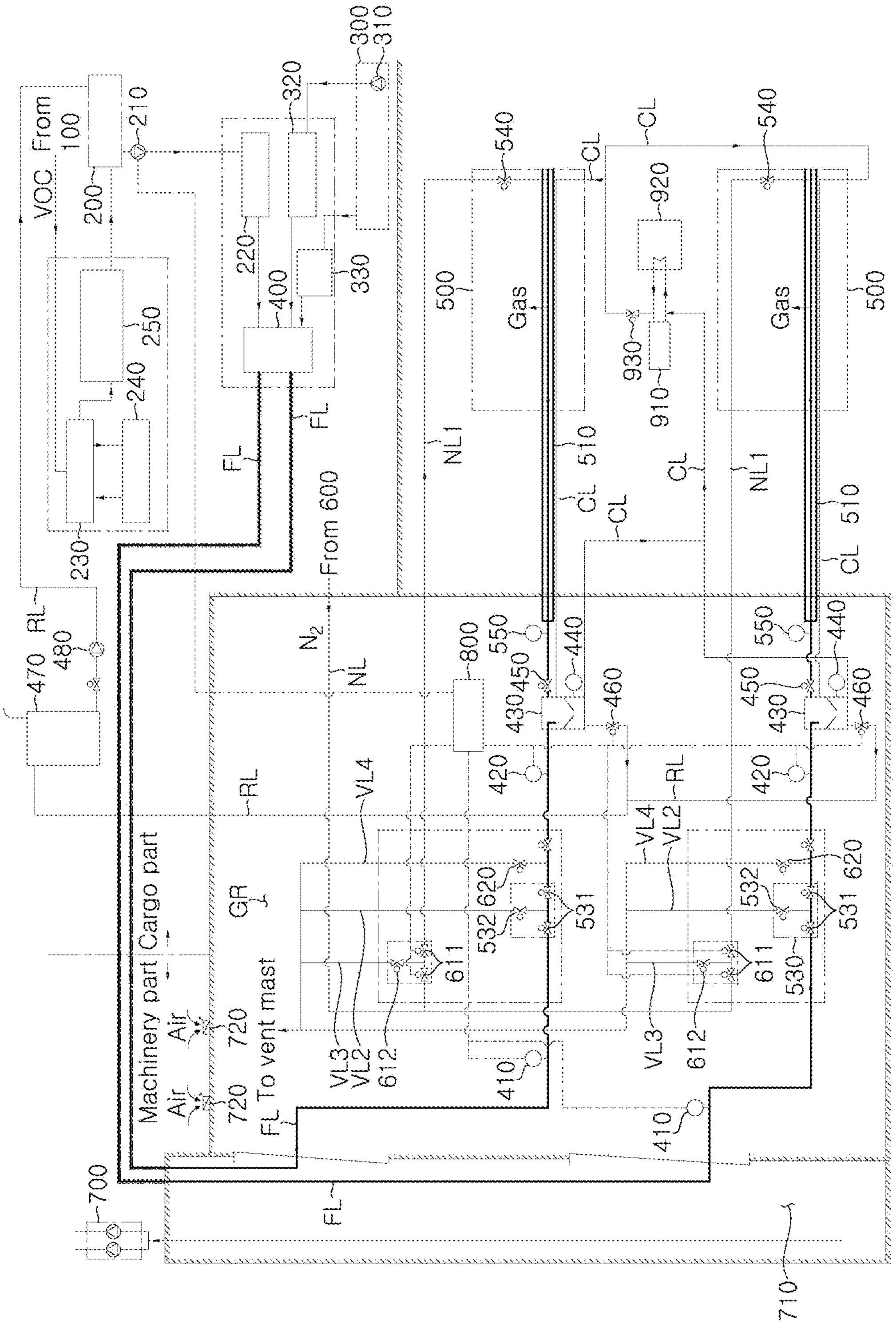
FIG. 3 is a view illustrating a fluid flow in which a gas fuel is supplied to an engine when the VOC fuel supply system according to the second embodiment of the present invention is operated in a gas fuel mode.
Figure 4:
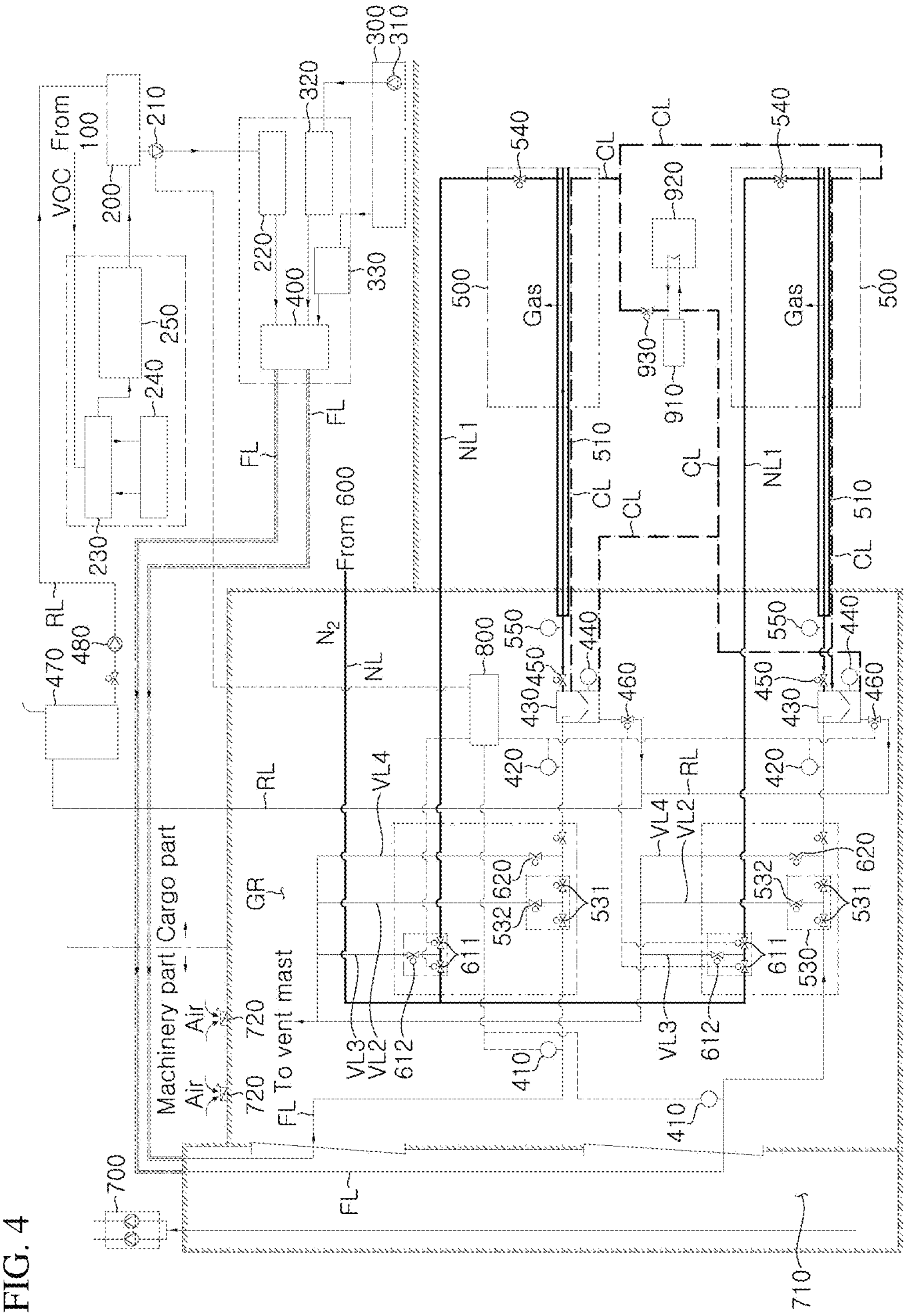
FIG. 4 is a view illustrating a fluid flow for purging of piping when the VOC fuel supply system according to the second embodiment of the present invention is operated in a fuel switching mode.
Figure 5:
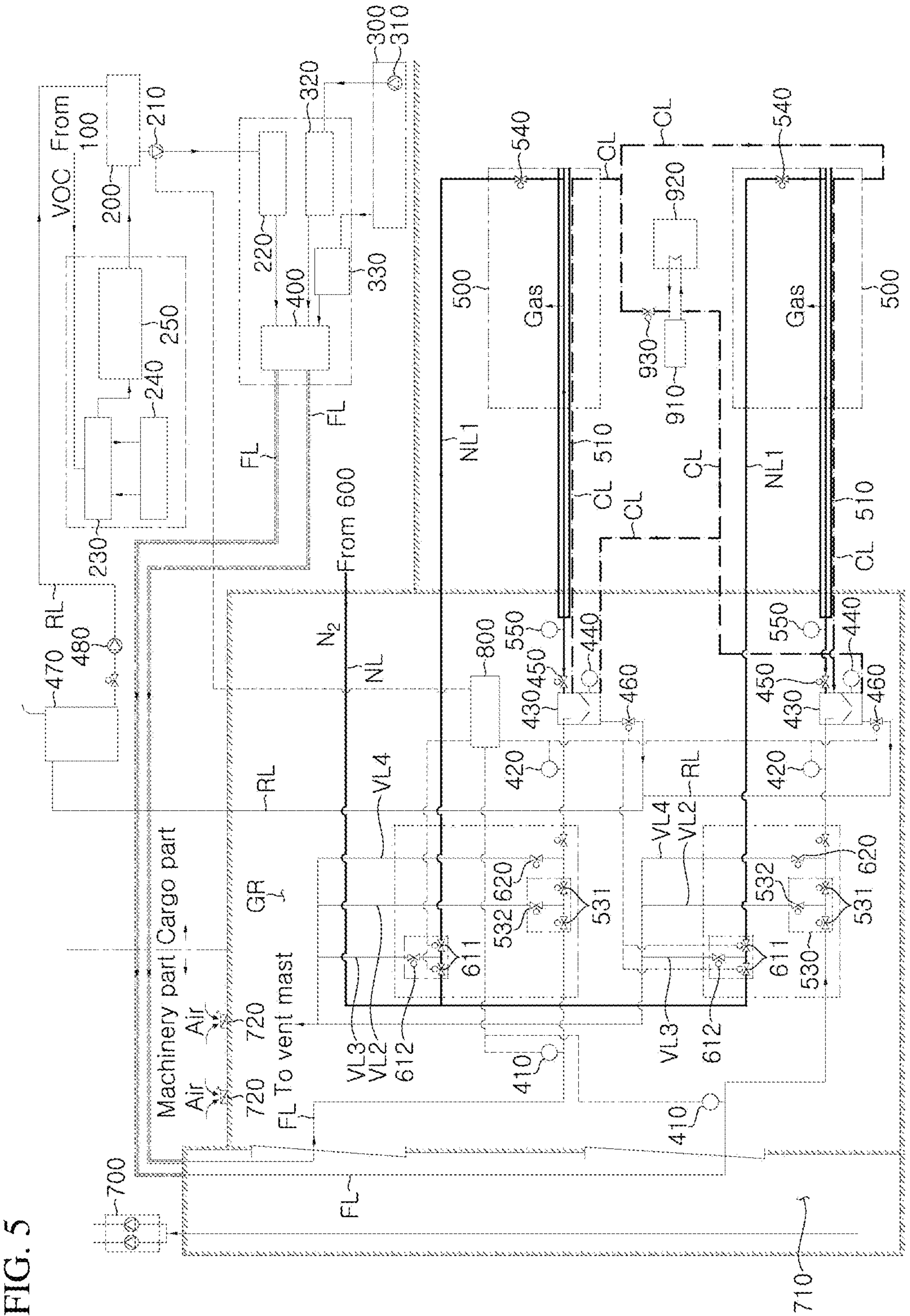
FIG. 5 is a view illustrating a fluid flow to treat VOCs collected in a drain filter during purging of the piping when the VOC fuel supply system according to the second embodiment of the present invention is operated in the fuel switching mode.

In order to fully understand operational advantages of the present invention and objectives achieved by exemplary embodiments of the present invention, reference should be made to the accompanying drawings, which illustrate exemplary embodiments of the present invention, and description thereof.

Hereinafter, exemplary embodiments of the present invention will be described in detail with reference to the accompanying drawings. It should be noted that like components will be denoted by like reference numerals throughout the specification and the drawings. In addition, it should be understood that the following embodiments may be modified in various ways and the scope of the present invention is not limited thereto.

Although a VOC fuel supply system and method according to some embodiments of the present invention will be described herein by way of example as being applied to a vessel, it should be understood that the VOC fuel supply system and method according to the embodiments may also be implemented on land.

Further, the embodiments of the invention described below will be described by way of example with reference to application to a crude oil carrier or a crude oil tanker carrying produced crude oil as cargo. However, the present invention may also be applied to any vessel or offshore floating structure that has a dual fuel engine having a potential environmental risk due to VOC emissions and capable of utilizing both a fuel oil and a gas fuel as fuel, such as a floating, production, storage and offloading (FPSO) unit that produces crude oil at sea, a petroleum product carrier that carries the produced crude oil, a floating storage unit (FSU) that can store the produced crude oil, and the like.

Further, in some embodiments described below, the vessel may be a liquefied gas fueled ship (LFS) that uses liquefied gas as a gas fuel.

Here, liquefied gas is a substance, which has a higher calorific value than VOCs and may include methane or ethane, and may be, for example, a hydrocarbon based liquefied gas fuel, such as liquefied natural gas (LNG), liquefied ethane gas (LEG), liquefied petroleum gas (LPG), liquefied ethylene gas (LEG), or a non-hydrocarbon based liquefied gas fuel, such as ammonia ($NH_3$), hydrogen ($H_2$), and the like.

However, the following embodiments will be described by way of example with reference to application of LNG as a gas fuel for engines and boil-off gas (BOG) generated by natural gasification of LNG or natural gas generated by vaporization of LNG may be also used alone or as a mixture with VOCs as fuel for the engines.

Further, in some embodiments of the invention described below, an engine may be a dual fuel engine that can use fuel oil and natural gas as fuel, optionally or in combination, and may include at least one of a high pressure gas injection engine, a medium pressure gas injection engine, and a low pressure gas injection engine.

Hereinafter, with reference to FIG. 1 to FIG. 5, a VOC fuel supply system and method and a vessel using VOCs as fuel according to some embodiments of the present invention will be described.

First, referring to FIG. 1, a VOC fuel supply system according to a first embodiment includes: an engine 500; a VOC supply unit that supplies a VOC gas fuel to the engine 500 while adjusting the pressure and temperature of volatile organic compounds (VOCs) to meet pressure/temperature conditions for the engine 500; a gas supply unit that supplies a gas fuel having a higher calorific value than VOCs to the engine 500 while adjusting the pressure and temperature of the gas fuel to meet the pressure/temperature conditions condition for the engine 500; and a fuel mixing unit 400 that mixes the VOCs with the gas fuel to produce a mixed gas fuel.

The engine 500 according to this embodiment is a dual fuel engine that can optionally use gas and oil as fuel, and may be operated in a gas fuel mode using a gas fuel as fuel and in an oil fuel mode using oil (fuel oil) as fuel.

The VOC fuel supply system and method according to this embodiment may supply a gas fuel as fuel for the engine 500 when the engine 500 is operated in the gas fuel mode. When the engine 500 is operated in the gas fuel mode, the engine 500 may be supplied with any one of natural gas, VOCs, or a mixture of natural gas and VOCs as the gas fuel, and this embodiment will be described with reference to the engine 500 operating in the gas fuel mode and being supplied with the mixed gas fuel as fuel.

Furthermore, in this embodiment, the engine 500 may be provided with a main engine for propelling a vessel and/or a power generation engine for generating electricity. In the drawings, for example, two engines 500 are shown.

The engine 500 is installed in an engine room ER, which is classified as a dangerous zone according to vessel safety regulations. The engine room ER is placed under an upper deck of the vessel.

When the engine 500 is a gas-fueled engine, gas piping (a fuel supply line FL) passing through the engine room ER is constructed as a dual pipe (double wall) 510.

Hereinafter, for ease of description, a section of the fuel supply line FL constructed by the dual pipe 510 will be referred to as a dual pipe 510 and a section not constructed by the dual pipe 510 will be referred to as the fuel supply line FL.

The dual pipe 510 may extend to a combustion chamber inside the engine 500 and a mixed fuel transferred from the fuel mixing unit 400 along the fuel supply line FL is injected into the combustion chamber of the engine 500 while flowing along the dual pipe 510.

On the other hand, a gas fuel that cannot be injected into the combustion chamber of the engine 500 and is recovered, or a gas fuel that needs to be vented when the engine 500 suffers from problems, such as a gas trip and the like, may be vented to a vent mast through a first venting line VL1 extending from the engine 500 to the vent mast. The first venting line VL1 may be provided with a venting valve 520 that is operated to vent or purge a fluid filling the engine 500 and the dual pipe 510 through opening/closing control with respect to the venting valve 520.

It is regulated that a space between an inner pipe and an outer pipe of the dual pipe 510, that is, a space inside the outer pipe, be filled with air to prevent various accidents, which can occur in the event of gas leakage from the inner pipe, and that the air filling the outer pipe be periodically replaced through ventilation.

The International Code of Safety for Vessels using Gases or other Low-flashpoint Fuels (IGF code) requires that the dual pipe 510 be ventilated 30 times per hour (so-called "30 air change rule"). By performing ventilation, gases can be discharged outside together with the ventilated air even in the event of gas leakage from the inner pipe, thereby preventing a danger caused by gas leakage.

Further, in order to supply fuel to the engine 500, a GVU room (GR) provided with a gas valve unit (GVU) to control fuel supply is also disposed near the engine room ER, which is a hazardous area, below the upper deck.

Since the GVU room (GR) is also disposed near the engine room ER which is a hazardous area, it is necessary to perform ventilation work for replacing internal air in the GVU room (GR) 30 times per hour.

It is regulated that ventilation air be used by suctioning air from an open safety area, such as a cargo area and the like.

Thus, the vessel is provided with a damper 720 that suctions external air, as ventilation air to be supplied to the dual pipe 510 and the GVU room (GR), from a place, such as a cargo space and the like, regulated as a non-hazardous open area by on-board regulation, and a discharge duct 710 and a ventilation fan 700 that discharge internal air in the dual pipe 510 and the GVU room (GR) to the outside.

The damper 720 may be provided with a flame screen to prevent flames from spreading in the event of fire.

According to this embodiment, the VOC supply unit may include: a VOC compressor 230 which compresses VOCs transferred from the cargo tank 100 storing fuel oil or crude oil; a cooling unit 240 that dissipates compression heat obtained by compressing the VOCs in the VOC compressor 230; a condenser 250 that liquefies the compressed VOCs in the VOC compressor 230; an LVOC tank 200 that stores liquid VOCs, that is, LVOCs, produced by condensing the compressed VOCs in the condenser 250; an LVOC vaporizer 220 that vaporizes the LVOCs discharged from the LVOC tank 200 and supplies the vaporized LCOCs as fuel for the engine 500; and an LVOC supply pump 210 that discharges the LVOCs to be supplied as fuel for the engine 500 from the LVOC tank 200 and transfers the LVOCs to the LVOC vaporizer 220.

Further, the gas supply unit according to this embodiment includes: a fuel tank 300 that stores a gas fuel to be supplied to the engine 500; an LNG vaporizer 320 that vaporizes liquefied natural gas (LNG) discharged from the fuel tank 300; a fuel supply pump 310 that discharges LNG from the fuel tank 300 and transfers LNG to the LNG vaporizer 320 to fuel the engine 500; and a BOG heater 330 that adjusts the temperature of boil-off gas (BOG) transferred from the fuel tank 300 to a temperature required for the engine 500.

In the fuel tank 300 according to this embodiment, the gas fuel may be stored in a liquid state, that is, as LNG. Furthermore, the fuel tank 300 according to this embodiment may be a pressurized pressure tank operated in a pressurized state at a higher pressure than normal pressure.

The fuel mixing unit 400 according to this embodiment may mix VOCs transferred from the VOC supply unit with natural gas transferred from the gas supply unit and supply a mixture of VOCs and natural gas to the engine 500.

Although VOCs or a gas fuel may be supplied alone as fuel for the engine 500, VOCs have a low calorific value and can decrease combustion efficiency when supplied alone as the gas fuel for the engine 500. According to this embodiment, the VOC fuel supply system is provided with the fuel mixing unit 400 to supply a mixed gas fuel produced by mixing VOCs with natural gas as fuel for the engine 500.

In the fuel mixing unit 400, VOCs vaporized in the LVOC vaporizer 220 are mixed with natural gas vaporized in the LNG vaporizer 320 and may be further mixed with vaporized gas heated in the BOG heater 330, as needed.

The mixed gas fuel of VOCs and natural gas mixed in the fuel mixing unit 400 is supplied as fuel for the engine 500 along the fuel supply line FL connecting the fuel mixing unit 400 to the engine 500.

In this embodiment, the VOC supply unit, the gas supply unit, and the fuel mixing unit 400 may be disposed on the upper deck of the vessel and the engine 500 may be provided to a separate engine room ER disposed below the upper deck. In this case, the fuel supply line FL connecting the fuel mixing unit 400 to the engine 500 sequentially passes through an upper portion of the upper deck (first zone), the interior of the GVU room (GR) (second zone), and the interior of the engine room ER (third zone). Since the first zone is exposed to the outside, the fuel supply line FL provided to the first zone may be insulated and the fuel supply line FL provided to the third zone may be provided as a dual pipe 510 for safety regulations.

In this embodiment, the mixed gas fuel may include up to about 25% VOCs and about 75% natural gas. However, a mixed ratio of VOCs and natural gas may be adjusted depending on load of the engine 500. Upon increase in load of the engine 500, the mixed ratio may be adjusted in response to increase in load of the engine 500 by increasing a proportion of natural gas in the mixed ratio while decreasing a proportion of VOCs in the mixed ratio.

Although VOCs exist as gases under atmospheric pressure, the VOCs have a high dew point and thus can condense even at room temperature unless additional heating is performed, when compressed to a pressure required for the engine 500.

For example, VOCs have a dew point of about 25° C. at 10 bar. In other words, when the engine 500 is a power generation engine that requires a gas fuel pressure of about 10 bar and the VOC supply unit is designed to compress VOCs to 10 bar, the VOCs compressed to 10 bar can condense to a liquid state, if a surrounding environment is below 25° C. in a process of supplying the VOCs to the engine 500.

In other words, in order to use VOCs as fuel for the engine 500, the pressure and temperature of the VOCs must be maintained under conditions for the engine 500. However, when the temperature of the VOCs is lower than the dew point of the VOCs, the VOCs condense.

Furthermore, even when VOCs and natural gas are mixed in the fuel mixing unit 400, it is difficult for chemical compositions thereof to be perfectly mixed. Accordingly, there is a possibility that some VOCs in the mixed gas fuel of the VOCs and the natural gas condense even at low temperature.

If these condensed VOCs in a liquid state enter the engine 500, the condensed VOCs can cause misfiring, explosion, and other accidents.

In order to vaporize the recondensed VOCs, the recondensed VOCs are heated to about 90° C. or more at 6 bar. That is, even if the recondensed VOCs do not flow into the engine 500, the recondensed VOCs can remain in the fuel supply line FL without being vaporized, unless a separate means for heating the recondensed VOCs is installed.

According to this embodiment, the VOC fuel supply system may further include a recondensed-VOC recycling unit that separates the recondensed liquid VOCs that condense and are contained in the mixed gas fuel while the mixed gas fuel is supplied from the fuel mixing unit 400 to the engine 500, from the mixed gas fuel so as to prevent the recondensed VOCs from being supplied to the engine 500, removes the recondensed liquid VOCs, which are separated from the mixed gas fuel, from the fuel supply line FL, and recovers and recycles the remove recondensed VOCs into fuel for the engine 500.

In other words, the recondensed-VOC recycling unit according to this embodiment may be essentially applicable to a vessel that uses VOCs as fuel for the engine 500 or a fuel supply system that supplies VOCs as fuel for the engine 500.

The recondensed-VOC recycling unit according to this embodiment includes: a fuel temperature measurement unit 410 provided to the fuel supply line FL and measuring the temperature of the mixed gas fuel supplied to the engine 500 along the fuel supply line FL, a fuel pressure measurement unit 420 measuring the pressure of the mixed fuel supplied to the engine 500 along the fuel supply line FL, and a drain filter 430 capturing the recondensed liquid VOCs contained in the mixed fuel transferred to the engine 500 along the fuel supply line FL.

Further, the drain filter 430 may be provided with a level measurement unit 440 that measures the level of the recondensed liquid VOCs collected in the drain filter 430, and an LVOC recovery valve 460 that discharges the recondensed VOCs collected in the drain filter 430.

The fuel temperature measurement unit 410, the fuel pressure measurement unit 420, and the drain filter 430 according to this embodiment may be arranged in the second zone of the fuel supply line FL, that is, inside the GVU room (GR).

The recondensed-VOC recycling unit according to this embodiment may further include: an LVOC recovery tank 470 that recovers and stores the recondensed VOCs discharged from the drain filter 430; an LVOC recovery line RL that connects the drain filter 430 to the LVOC recovery tank 470 and defines a path for the recondensed VOCs discharged from the drain filter 430 to be transferred to the VOC recovery tank 470; and an LVOC transfer pump 480 that pressurizes the recondensed VOCs collected in the LVOC recovery tank 470 to transfer the recondensed VOCs to the LVOC tank 200.

The LVOC recovery tank 470 and the LVOC transfer pump 480 according to this embodiment may be disposed in an open space on the upper deck.

According to this embodiment, the recondensed VOCs recovered in the LVCO recovery tank 470 are transferred to the LVOC tank 200 along the LVOC recovery line RL connecting the LVOC recovery tank 470 to the LVOC tank 200 by the LVOC transfer pump 480, and stored in the LVOC tank 200. In other words, according to this embodiment, the recondensed VOCs recovered from the drain filter 430 may be re-supplied as fuel for the engine 500 through the VOC supply unit.

According to this embodiment, since VOCs in a liquid state are exposed to a risk of explosion or the like if the liquid VOCs enter the engine 500, the drain filter 430 may be provided to the second zone of the fuel supply line FL, more specifically between the gas valve units 530, 610 and the dual pipe 510.

In this embodiment, the mixed gas fuel passes through the drain filter 430 while flowing along the fuel supply line FL, when transferred to the engine 500.

As shown in FIG. 1, the drain filter 430 according to this embodiment is provided at an upper portion thereof with a gas inlet pipe (not shown), into which the mixed gas fuel flows, and at a lower portion thereof with a funnel-shaped hopper (not shown).

In other words, the mixed gas fuel supplied to the engine 500 along the fuel supply line FL flows into the drain filter 430 through the gas inlet pipe of the drain filter 430 before being supplied to the engine 500, and the liquid VOCs contained in the mixed gas fuel are collected in the lower portion of the drain filter 430 through the hopper while passing through the drain filter 430.

In addition, the gas inlet pipe of the drain filter 430 may extend to an interior space of the drain filter 430 and may have a downwardly bent end (inverted-L shape) such that a bent portion of the gas inlet pipe faces the hopper in a downward direction.

The level measurement unit 440 according to this embodiment may detect a liquid level of the recondensed liquid VOCs collected in the drain filter 430 and transmit level information to the controller 800. In addition, the level measurement unit 440 may further have a function of detecting the liquid level of the recondensed liquid VOCs collected in the drain filter 430 and generating an alarm to notify an operator when a level measurement value reaches a preset level.

When the level measurement unit 440 detects that the liquid level measurement has reached a preset level, the controller 800 may control the system to switch an operation mode of the engine 500 from a gas fuel mode to an oil fuel mode such that fuel oil is supplied as fuel to the engine 500. Alternatively, the operation mode of the engine 500 may be switched to a mode that utilizes a gas alone as fuel such that gas fuel is supplied to the engine 500 as fuel by the gas supply unit.

When the operation mode of the engine 500 is switched to the oil fuel mode, operation of the VOC supply unit and the gas supply unit is interrupted and the fuel oil supply unit (not shown) may be operated to supply the fuel oil stored in the cargo tank 100 or a separate fuel oil storage tank (not shown) as fuel for the engine 500.

Furthermore, preferably, the level measurement unit 440 according to this embodiment employs a UV type level switch that detects the liquid level with ultraviolet light. Since VOCs in a liquid state have a very low specific gravity of about 0.4, the level measurement unit 440 cannot adopt a ball float type level switch that detects the liquid level using buoyancy.

The fuel temperature measurement unit 410 according to this embodiment is a means for measuring the temperature of the mixed gas fuel supplied from the fuel mixing unit 400 to the engine 500 along the fuel supply line FL.

A temperature measurement value measured by the fuel temperature measurement unit 410 may be transmitted to the controller 800. The controller 800 may receive temperature information from the fuel temperature measurement unit 410 and interrupts operation of the LVOC supply pump 210 when the temperature measurement value is lower than a preset temperature.

That is, the controller 800 may implement control logic as a failsafe to block supply of VOC fuel from the LVOC tank 200 to the fuel mixing unit 400, upon determining, based on the temperature measurement value sent from the fuel temperature measurement unit 410, that recondensed VOCs are produced or a VOC recondensation condition occurs.

In this embodiment, the condition allowing recondensation of VOCs may be 30° C. That is, the controller 800 may interrupt operation of the LVOC supply pump 210 when the temperature measurement value measured by the fuel temperature measurement unit 410 is below 30° C.

On the other hand, the gas valve unit provided to the GVU room (GR) and capable of controlling supply of the gas fuel includes double blocking valve units 530, 610. Each of the double blocking valve units 530, 610 may include two shut-off valves 531 or 611 arranged in series at intervals to open and close a fluid flow through opening/closing control, and a pressure regulation valve 532 or 612 disposed on a line VL2, VL3, which branches off from a pipeline between the two shut-off valves 531, 611 and is connected to the vent mast, to vent the fluid remaining in the pipeline.

The double blocking valve units 530, 610 may include a gas blocking valve unit 530 disposed on the fuel supply line FL. Here, the gas blocking valve unit 530 may include two gas shut-off valves 531 and a gas pressure regulation valve 532 disposed on a gas venting line VL2, which branches off from the fuel supply line (FL) between the two gas shut-off valves 531 and is connected to the vent mast.

For example, when a gas trip of the engine 500 occurs, the two gas shut-off valves 531 are closed and the flow of the gas fuel is blocked. An increase in pressure between the two gas shut-off valves 531 caused by blocking the flow of the gas fuel decreases as the gas pressure regulation valve 532 is open to vent the gas through the gas venting line VL2.

On the other hand, in order to restart the engine 500 after switching the fuel supply mode of the engine 500 or resolving a problem with fuel supply, such as a gas trip and the like, it is necessary to perform purging by removing the remaining fluid in the fuel supply line FL and supplying an inert gas.

Thus, an inert gas supply line NL is installed on the vessel downstream of the gas blocking valve unit 530 of the fuel supply line FL to communicate with the inert gas supply unit 600, which generates and supplies an inert gas, for example, nitrogen, to form a supply path of the inert gas to the fuel supply line FL.

The double blocking valve units 530, 610 according to this embodiment may include a purging blocking valve unit 610 on the inert gas supply line NL.

The purging blocking valve unit 610 may include two purging shut-off valves 611 and a purging pressure regulation valve 612 disposed in a purging venting line VL3, which branches off from the inert gas supply line NL between the two purging shut-off valves 611 and is connected to the vent mast.

For example, in normal operation, the two purging shut-off valves 611 are closed such that the inert gas supply line NL is double blocked, and the purging pressure regulation valve 612 is open such that the gas transferred along the fuel supply line FL is fundamentally blocked from flowing back into the inert gas supply line NL. Since the two purging shut-off valves 611 are normally closed, the gas transferred along the fuel supply line FL is double blocked by the purging shut-off valves 611 and the reverse flow gas flows to the vent mast, even if the gas transferred from the fuel supply line FL flows back to the inert gas supply line NL.

In this embodiment, the purging shut-off valve 611 is a throttling valve, which can gradually increase or decrease the pressure of the inert gas passing through the purging shut-off valve 611 through adjustment in opening/closing speed thereof.

According to this embodiment, it is possible to recover the recondensed VOCs collected in the drain filter 430 using the inert gas supply unit 600, the inert gas supply line NL, and the gas valve units 530, 610, which are essentially provided to a typical gas engine-based fuel supply system.

According to this embodiment, in order to recover the recondensed VOCs collected in the drain filter 430, the VOC fuel supply system may further a filter blocking valve 450 provided to the fuel supply line FL between the drain filter 430 and the dual pipe 510 to block the recondensed VOCs from entering the dual pipe 510 upon discharge of the recondensed VOCs from the drain filter 430.

Hereinafter, a method of recovering recondensed VOCs generated during supply of a mixed gas fuel from the fuel mixing unit 400 to the engine 500 will be described.

First, the mixed gas fuel from the fuel mixing unit 400 is transferred to the engine 500 after sequentially passing through the fuel temperature measurement unit 410, the gas blocking valve unit 530, the fuel pressure measurement unit 420, the drain filter 430, and the dual pipe 510 along the fuel supply line FL. Here, the recondensed VOCs in a liquid state generated during transfer of the mixed gas fuel is filtered out by the drain filter 430 disposed downstream of the gas blocking valve unit 530 and upstream of the dual pipe 510.

The level measurement unit 440 measures a liquid level of the recondensed VOCs collected in the drain filter 430 and sends liquid level information to the controller 800. When the controller 800 determines that the liquid level measured by the level measurement unit 440 exceeds a preset level, the controller 800 interrupts and switches a gas fuel mode of the engine 500 to an oil fuel mode.

When the gas fuel mode of the engine 500 is interrupted, the venting valve 520 is operated to be open automatically or in response to an instruction from the controller 800. That is, when the gas fuel mode of the engine 500 is interrupted, the venting valve 520 opens to allow the mixed gas fuel remaining in the dual pipe 510 and the engine 500 to vent to the vent mast along the first venting line VL1.

The filter blocking valve 450 is operated to be open during operation of the engine 500 in the gas fuel mode and to be closed automatically or by the controller 800 when all of the mixed gas fuel remaining in the dual pipe 510 and the engine 500 is vented.

In addition, when the filter blocking valve 450 is closed, the controller 800 may also close the gas shut-off valve 531 while opening the purging shut-off valve 611 so as to allow the inert gas from the inert gas supply unit 600 to flow into the drain filter 430 downstream of the gas blocking valve unit 530.

Since liquid VOCs, that is, LVOCs, have a specific gravity of about 0.4, LVOCs can be transferred by the pressure of an inert gas, for example, nitrogen. Here, the controller 800 gradually opens the purging shut-off valve 611 to allow a gradual increase in pressure measurement value while checking the pressure measurement value measured by the fuel pressure measurement unit 420 provided to the fuel supply line FL between the gas blocking valve unit 530 and the drain filter 430.

The inert gas supplied from the inert gas supply unit 600 has a pressure of about 6 bar, and, when the purging shut-off valve 611 opens suddenly, the inert gas having a relatively high pressure of 6 bar suddenly flows into the drain filter 430, thereby causing the recondensed LVOCs collected in the drain filter 430 to splash or entrain in the flow.

Therefore, according to this embodiment, the purging shut-off valve 611 is preferably opened gradually while being adjusted in opening speed thereof according to the pressure measurement value measured by the fuel pressure measurement unit 420 such that the pressure of the inert gas flowing into the drain filter 430 does not abruptly increase and a pressure measurement value per hour does not exceed a preset pressure change rate.

Furthermore, when the pressure measurement value measured by the fuel pressure measurement unit 420 reaches a preset reference value, the controller 800 according to this embodiment opens the LVOC recovery valve 460 to transfer the recondensed liquid VOCs collected in the drain filter 430 to the LVOC recovery tank 470 along the LVOC recovery line RL.

The LVOC recovery tank 470 according to this embodiment is disposed on the upper deck of the vessel and is required to be placed in a zone classified as a safety area. By placing the LVOC recovery tank 470 in the safety area, an explosion risk affecting other equipment or zone can be minimized.

Upon completion of transfer of the recondensed VOCs from the drain filter 430 to the LVOC recovery tank 470, the controller 800 may perform a purging operation by opening the filter blocking valve 450 to allow nitrogen to be supplied from the inert gas supply unit 600 to the engine 500.

Upon completion of the purging operation, the controller 800 may control respective facilities to allow the mixed gas fuel from the fuel mixing unit 400 to be supplied to the engine 500 by switching the engine 500 back to the gas fuel mode and closing the purging shut-off valve 611 while opening the gas shut-off valve 531.

According to this embodiment, since the recondensed VOCs collected in the LVOC recovery tank 470 may be transferred to the LVOC tank 200 using the LVOC transfer pump 480, the recondensed VOCs separated by the drain filter 430 may be returned to the VOC supply unit for use as a gas fuel in the engine 500.

Next, a VOC fuel supply system and method for a vessel according to a second embodiment will be described with reference to FIG. 2 to FIG. 5.

The second embodiment of the invention described herein is distinguished from the first embodiment described above in terms of a method of recovering VOCs remaining in the piping upon interruption of the gas fuel mode for supplying the VOCs as fuel to the engine 500 due to a trip, a mode switch, and the like.

More specifically, unlike the VOC fuel supply system according to the first embodiment, the VOC fuel supply system according to the second embodiment described below further includes an LVOC purging line NL1, an LVOC purging valve 540, a fourth venting line VL4, a VOC venting valve 620, a purging temperature measurement unit 550, a cooling line CL, and a cooling valve 730 to purge the fuel supply line FL and the dual pipe 510 upon interruption of the gas fuel mode.

On the other hand, the VOC fuel supply system according to the second embodiment may omit some components of the first embodiment including the filter blocking valve 450, the venting line VL1, the venting valve 520, and the line extending from the inert gas supply line NL to the fuel supply line FL between the gas shut-off valve 531 and the drain filter 430 downstream of the purging shut-off valve 611.

Alternatively, the LVOC purging line NL1, the LVOC purging valve 540, the fourth venting line VL4, the VOC venting valve 620, the purging temperature measurement unit 550, the cooling line CL, and the cooling valve 730, which are not included in the VOC fuel supply system of the vessel according to the first embodiment and are included only in the second embodiment, may be used upon purging of the piping.

In the following description, the VOC fuel supply system according to this embodiment not including the venting line VL1, the venting valve 520, and the line extending from the inert gas supply line NL to the fuel supply line FL between the gas shut-off valve 531 and the drain filter 430 down-stream of the purging shut-off valve 611, which are provided to the first embodiment, will be described by way of example.

The following description will focus on different features of the second embodiment from the first embodiment and descriptions of the remaining components and operation thereof will be omitted. However, it should be noted that, despite omission of detailed descriptions of some components, the description of the first embodiment may also be applicable to components denoted by the same reference numerals and operation of the components.

On the other hand, the engine 500 according to some embodiments may also be operated in an oil fuel mode using diesel as fuel. Thus, the vessel according to the embodiments is provided with a selective catalytic reduction (SCR) system for removing nitrogen oxides (NOx) from exhaust gases emitted from the engine 500. The SCR system is a system for removing the nitrogen oxides from the exhaust gases through chemical reaction with a reductant in a catalyst bed.

The SCR system may include a reductant tank 920 storing a reductant for reaction with nitrogen oxides, a chiller unit 910 cooling the reductant, and a reactor (not shown) in which a catalyst bed is formed and reaction occurs between nitrogen oxides in the exhaust gas and the reductant.

The reductant may be urea or ammonia, and urea is used by way of example in this embodiment. The reductant tank 920 storing the urea is maintained at a temperature of about 30° C. or less in order to store the reductant for a long period of time.

Through piping (not shown) connecting the chiller unit 910 to the reductant tank 920, a low-temperature heat medium cooled in the chiller unit 910 is supplied to the reductant tank 920 and the hot heat medium having an increased temperature in the course of cooling the reductant tank 920 is returned to the chiller unit 910, thereby maintaining the reductant tank 920 at a preset temperature.

The VOC fuel supply system according to this embodiment may further include a cooling line CL along which the low-temperature heat medium cooled in the chiller unit 910 is supplied to the dual pipe 510 to cool the dual pipe 510, and a cooling valve 930 provided to the cooling line CL.

According to this embodiment, the fuel supply system can condense VOCs remaining in the dual pipe 510 while cooling and recovering LVOCs remaining in the liquid state by supplying the low-temperature heat medium to the dual pipe 510 along the cooling line CL.

Since the VOCs remaining in the dual pipe 510 can be condensed and the remaining LVOCs can be cooled by cooling the dual pipe 510 using the low-temperature heat medium supplied along the cooling line CL, the fuel supply system according to this embodiment can recover the condensed or cooled LVOCs to the drain filter 430 along the inner pipe of the dual pipe 510 and the fuel supply line FL.

Although the fuel supply system according to the first embodiment described above is provided with the filter blocking valve 450 that can block the recondensed VOCs from entering the dual pipe 510, the fuel supply system according to this embodiment may omit the filter blocking valve 450 or may maintain the filter blocking valve 450 in an open state while purging is performed.

In this embodiment, the cooling line CL may form a circulation line from a downstream distal end of the dual pipe 510 to the chiller unit 910 through the drain filter 430 with reference to a fuel flow direction from the chiller unit 910.

That is, the low-temperature heat medium flows along the cooling line CL in a direction opposite to a normal flow direction of the gas fuel and is supplied from the engine 500 to the drain filter 430. The heat medium collected in the drain filter 430 may be recirculated to the chiller unit 910 along the cooling line CL.

According to this embodiment, the fuel supply system may further include a purging temperature measurement unit 550 provided to the fuel supply line FL between the drain filter 430 and the dual pipe 510 and measuring the temperature of the fluid recovered from the dual pipe 510 to the drain filter 430.

The controller 800 may control a cooling temperature of the dual pipe 510 by controlling the cooling valve 930 according to a temperature measurement value measured by the purging temperature measurement unit 550.

According to this embodiment, the fuel supply system may further include an LVOC purging line NL1 extending from the inert gas supply line NL to the distal end of the dual pipe 510 through the purging shut-off valve 611 and an LVOC purging valve 540 provided to the LVOC purging line NL1.

In addition, according to this embodiment, the fuel supply system may further include a fourth venting line VL4 that branches off from the fuel supply line FL downstream of the gas shut-off valve 531 and is connected to the vent mast, and a VOC venting valve 620 provided to the fourth venting line VL4.

The controller 800 may control the LVOC purging valve 540 to supply nitrogen from the nitrogen supply unit 600 to the distal end of the dual pipe 510 along the LVOC purging line NL1, thereby transferring the remaining VOCs in the liquid state in the dual pipe 510 to the drain filter 430.

Further, the controller 800 may also control the LVOC purging valve 540 to supply nitrogen to the distal end of the dual pipe 510 along the LVOC purging line NL1 while controlling the VOC recovery valve 460 to transfer the LVOCs recovered by the drain filter 430 to the LVOC recovery tank 470 along the LVOC recovery line RL.

When the engine 500 according to this embodiment is operated in the gas fuel mode, the method of supplying a mixed gas fuel or VOCs to the engine 500 is the same as the method according to the first embodiment.

The mixed gas fuel (or VOCs) in the fuel mixing unit 400 may be supplied to the combustion chamber of the engine 500 through the inner tube of the dual pipe 510 after sequentially passing through the fuel temperature measurement unit 410, the gas shut-off valve 531, the fuel pressure measurement unit 420, the drain filter 430 and the purging temperature measurement unit 550 along the fuel supply line FL.

LVOCs produced through condensation of gaseous VOCs during transfer of the mixed gas fuel are filtered out by the drain filter 430 downstream of the gas shut-off valve 531 and upstream of the dual pipe 510.

The gas fuel mode may be interrupted when a trip occurs in the engine 500 or the fuel supply unit, or when there is a need to switch the operation mode of the engine 500 to an oil fuel mode, depending on operating conditions of the vessel or the like.

By way of example, the controller 800 may receive a liquid level measurement value of the drain filter 430, as measured by the level measurement unit 440, and may interrupt the gas fuel mode of the engine 500 and switch the operation mode of the engine 500 to the oil fuel mode, when the liquid level measurement value exceeds a preset value.

The gas fuel not injected into the combustion chamber of the engine 500 or the gas fuel, particularly VOCs, remaining in the pipe may be recovered in a liquid state by the method according to this embodiment when a problem with the engine 500, such as a gas trip and the like, occurs, or when the operation mode of the engine 500 is switched from the gas fuel mode to the oil fuel mode.

According to this embodiment, when the gas fuel mode is interrupted, the method of recovering LVOCs while purging the fuel supply line FL and the dual pipe 510 is performed as follows.

In the first embodiment described above, the recondensed VOCs generated during supply of the mixed gas fuel from the fuel mixing unit 400 to the engine 500 are recovered, whereas in this embodiment, even VOCs remaining in a gaseous state in the pipe are condensed to be recovered in a liquid state.

According to this embodiment, when the gas fuel mode is interrupted, the gas shut-off valve 531 in an open state in the gas fuel mode is first controlled to be closed. Here, the operation of the LVOC supply pump 210 may also be interrupted.

After the gas shut-off valve 531 is closed, the pressure in the fuel supply line FL and the dual pipe 510 downstream of the gas shut-off valve 531 is maintained.

When the gas shut-off valve 531 is closed, the controller 800 may open the cooling valve 930 to allow at least some of the hot heat medium having an increased temperature while cooling the reductant tank 920 to flow into the cooling line CL.

The hot heat medium having an increased temperature while cooling the reductant tank 920, that is, the heat medium flowing into the cooling line CL, may have a temperature of about 10° C. to about 15° C., preferably about 12° C. or less. Thus, the temperature of the hot heat medium is low enough to cool the dual pipe 510 while condensing the gaseous VOCs remaining in the piping.

When the cooling valve 930 opens to allow the heat medium to flow into the cooling line CL, the heat medium can rapidly cool the dual pipe 510 while flowing from the distal end of the dual pipe 510 in the engine 500 to the fuel supply line FL upstream of the dual pipe along the cooling line CL that surrounds the dual pipe 510.

The heat medium having an increased temperature while cooling the dual pipe 510 along the cooling line CL is recirculated back to the chiller unit 910.

The cooling line CL may be disposed to pass the drain filter 430 to ensure that the heat medium recirculated to the chiller unit 910 also condenses the gaseous VOCs remaining in the drain filter 430.

On the other hand, the temperature measurement value measured by the purging temperature measurement unit 550, which measures the temperature of the fuel supply line FL upstream of the dual pipe 510, is sent to the controller 800. The controller 800 may cool the dual pipe 510 through flow of the heat medium until the temperature measurement value measured by the purging temperature measurement unit 550, that is, the temperature of the fuel supply line FL upstream of the dual pipe 510, becomes less than a preset value.

In this embodiment, the controller 800 may cool the purging temperature measurement unit 550 to a temperature at which VOCs condense, for example, to about 30° C. That is, the controller 800 may close the cooling valve 930 to interrupt the operation of cooling the dual pipe 510 when the temperature measurement value measured by the purging temperature measurement unit 550 is below 30° C.

In addition, when the cooling valve 930 is closed, the controller 800 may control the LVOC purging valve 540 to be open to allow the inert gas to be transferred from the inert gas supply unit 600 to the dual pipe 510 along the LVOC purging line NL1. Here, the purging shut-off valve 611 is controlled to be open.

The inert gas transferred from the inert gas supply unit 600 along the LVOC purging line NL1 flows to the drain filter 430 after passing through the dual pipe 510 and the fuel supply line FL. As the inert gas is supplied to the drain filter 430 through the dual pipe 510 and the fuel supply line FL, LVOCs remaining in the dual pipe 510 and the fuel supply line FL are also transferred to the drain filter 430. Here, the filter blocking valve 450 is controlled to be open, when provided to the fuel supply system.

Upon supply of the inert gas to the dual pipe 510 along the LVOC purging line NL1, the controller 800 may control an opening degree of the purging shut-off valve 611 to allow a gradual increase in the pressure measurement value while checking the pressure measurement value measured by the fuel pressure measurement unit 420.

The inert gas supplied from the inert gas supply unit 600 has a pressure of about 6 bar, and, when the purging shut-off valve 611 opens suddenly, the inert gas having a relatively high pressure of 6 bar suddenly flows into the drain filter 430, thereby causing the recondensed LVOCs collected in the drain filter 430 to splash or entrain in the flow.

In addition, when the inert gas begins to enter the drain filter 430, the controller 800 may open the VOC venting valve 620 to control the gas in the drain filter 430, that is, the inert gas, to be supplied to the vent mast along the fourth venting line VL4.

Further, when the pressure measurement value measured by the fuel pressure measurement unit 420 increases to a preset value, the controller 800 may open the LVOC recovery valve 460 to allow the LVOCs collected in the drain filter 430 to be recovered to the LVOC recovery tank 470 along the LVOC recovery line RL.

The LVOC recovery tank 470 may be disposed in a safe area on the upper deck to minimize impact of an explosion on other places.

The recondensed VOCs recovered to the LVOC recovery tank 470 is introduced into the LVOC recovery line RL, which connects the LVOC recovery tank 470 to the LVOC tank 200, by the LVOC transfer pump 480, to be transferred to the LVOC tank 200 and stored in the LVOC tank 200.

That is, according to this embodiment, the LVOCs discharged from the drain filter 430 may be re-supplied as fuel to the engine 500 through the VOC supply unit.

Upon completion of the above processes, purging of the dual pipe 510 and the fuel supply line FL is considered complete and the gas fuel mode or the oil fuel mode may be resumed.

As described above, the fuel supply system and method according to the embodiments of the invention may prevent a condensed gas in a liquid state from entering the engine 500 which uses a mixed fuel of VOCs and LNG.

In addition, the fuel supply system and method according to the embodiments of the invention may condense VOCs to recover the VOCs in a liquid state through fundamental facilities provided to an existing vessel, that is, the chiller unit 910 and the inert gas supply unit 600 connected to the GVU room (GR), and may control purging of piping and recovery of LVOCs simply through measurement value of temperature and pressure.

Although some embodiments have been described herein, it will be apparent to those skilled in the art that the present invention is not limited thereto and may be realized by various modifications or variations without departing from the spirit of the invention.

| <List of Reference Numeral> | |
|---|---|
| 100: Cargo tank | |
| 200: LVOC tank | 210: LVOC supply pump |
| 220: LVOC vaporizer | 230: VOC compressor |
| 240: Cooling unit | 250: Condenser |
| 300: Fuel tank | 310: Fuel supply pump |
| 320: LNG vaporizer | 330: BOG heater |
| 400: Fuel mixing unit | 410: Fuel temperature measurement unit |
| 420: Fuel pressure measurement unit | 430: Drain filter |
| 440: Level measurement unit | 450: Filter blocking valve |
| 460: LVOC recovery valve | 470: LVOC recovery tank |
| 480: LVOC transfer pump | |
| 500: Engine | 510: Dual pipe |
| 520: Venting valve | 530: Gas blocking valve unit |
| 531: Gas shut-off valve | 532: Gas pressure regulation valve |
| 540: LVOC purging valve | 550: Purging temperature measurement unit |
| 600: Inert gas supply unit | 610: Purging blocking valve unit |
| 611: Purging shut-off valve | 612: Purging pressure regulation valve |
| 620: VOC venting valve | |
| 700: Ventilation fan | 710: Discharge duct |
| 720: Damper | 800: Controller |
| 910: Chiller unit | 920: Reductant tank |
| 930: Cooling valve | |
| FL: Fuel supply line | RL: LVOC recovery line |
| NL: Inert gas supply line | VL1, VL2, VL3, VL4: Venting line |
| NL1: LVOC purging line | CL: Cooling line |
| ER: Engine room | GR: GVU room |

The invention claimed is:

1. A VOC fuel supply system comprising:

an engine operable in a gas fuel mode using a gas as fuel;

a VOC supply unit supplying VOCs (Volatile Organic Compounds) as fuel to the engine;

a fuel supply line connecting the VOC supply unit to the engine and defining a path for transfer of a gaseous VOC fuel from the VOC supply unit to the engine; and a drain filter provided to the fuel supply line and filtering out recondensed liquid VOCs contained in the VOC fuel upstream of the engine.

2. The VOC fuel supply system according to claim 1, wherein the drain filter comprises:

a funnel-shaped hopper disposed at a lower portion of the drain filter; and a gas inlet pipe disposed at an upper portion of the drain filter and extending at one end thereof from the fuel supply line and bent at the other end thereof towards the hopper to introduce the VOC fuel into the drain filter, and wherein the recondensed liquid VOCs contained in the VOC fuel are collected under the hopper and only the gaseous VOC fuel with the recondensed liquid VOCs separated therefrom is discharged.

3. The VOC fuel supply system according to claim 1, further comprising:

a gas supply unit supplying a gas fuel having a higher calorific value than the VOCs to the engine; and a fuel mixing unit supplying a mixed gas fuel of the gas fuel supplied from the gas supply unit and the VOC fuel supplied from the VOC supply unit to the engine, wherein the engine receives the mixed gas fuel as the gas fuel.

4. The VOC fuel supply system according to claim 1, further comprising:

a recondensed-VOC recycling unit recovering the recondensed liquid VOCs collected in the drain filter.

5. The VOC fuel supply system according to claim 4, wherein the recondensed-VOC recycling unit further comprises:

a fuel temperature measurement unit provided to the fuel supply line upstream of the drain filter and measuring a temperature of the gas fuel supplied to the engine; and a controller interrupting operation of the VOC supply unit when a temperature measurement value measured by the fuel temperature measurement unit becomes lower than a preset temperature.

6. The VOC fuel supply system according to claim 4, wherein the recondensed-VOC recycling unit comprises:

a level measurement unit measuring a liquid level in the drain filter;

a filter blocking valve blocking a fluid flow from the drain filter to the engine;

a venting valve venting the gas fuel from between the filter blocking valve and the engine and from the engine; and a controller interrupting operation of the VOC supply unit and closing the filter blocking valve while opening the venting valve, when a liquid level measurement value measured by the level measurement unit reaches a preset level.

7. The VOC fuel supply system according to claim 4, wherein the recondensed-VOC recycling unit comprises:

an LVOC recovery valve discharging the recondensed liquid VOCs collected in the drain filter;

an LVOC recovery tank storing the recondensed liquid VOCs discharged from the drain filter; and an LVOC transfer pump supplying the recondensed liquid VOCs stored in the LVOC recovery tank to the VOC supply unit.

8. The VOC fuel supply system according to claim 4, wherein the recondensed-VOC recycling unit further comprises an inert gas supply unit supplying an inert gas to the drain filter to discharge the recondensed liquid VOCs from the drain filter.

9. The VOC fuel supply system according to claim 8, wherein the recondensed-VOC recycling unit comprises:

a double blocking valve unit blocking a path between the VOC supply unit and the drain filter when the inert gas is supplied to the drain filter;

a filter blocking valve blocking a path between the drain filter and the engine when the inert gas is supplied to the drain filter;

a fuel pressure measurement unit measuring a pressure of a fluid supplied from the fuel supply line to the drain filter;

an LVOC recovery valve discharging the recondensed liquid VOCs collected in the drain filter; and a controller opening the LVOC recovery valve when a pressure measurement value measured by the fuel pressure measurement unit reaches a preset pressure.

10. The VOC fuel supply system according to claim 9, wherein the double blocking valve unit comprises: a valve regulating the pressure of the fluid passing through the double blocking valve unit, and the controller regulates a pressure of the inert gas supplied to the drain filter by controlling an opening degree of the double blocking valve unit such that the pressure measurement value measured by the fuel pressure measurement unit does not exceed a preset pressure change rate.

11. The VOC fuel supply system according to claim 1, further comprising:

a cooling line in which a heat medium is circulated to cool the fuel supply line so as to condense gaseous VOCs remaining in the fuel supply line;

a cooling valve provided to the cooling line; and a controller controlling the cooling valve to be open when the gas fuel mode is interrupted.

12. The VOC fuel supply system according to claim 11, further comprising:

a reductant tank storing a reductant for denitrifying exhaust gases discharged from the engine; and a chiller unit circulating a heat medium for maintaining a temperature of the reductant tank, wherein the cooling line branches off from a line, along which the heat medium having an increased temperature while cooling the reductant tank is recirculated to the chiller unit, and is connected to a distal end of the fuel supply line.

13. The VOC fuel supply system according to claim 11, further comprising:

an inert gas supply unit supplying an inert gas to the fuel supply line to discharge liquid VOCs (LVOCs) remaining in the fuel supply line;

an LVOC purging line connecting the inert gas supply unit to the fuel supply line;

an LVOC purging valve provided to the LVOC purging line; and a purging temperature measurement unit measuring a temperature of the fuel supply line, wherein the controller opens the LVOC purging valve to allow the inert gas to be supplied to the fuel supply line so as to allow the LVOCs to be discharged from the fuel supply line by the inert gas, when a temperature measurement value measured by the purging temperature measurement unit reaches a preset value.

14. The VOC fuel supply system according to claim 13, further comprising:

a fourth venting line transferring a gas discharged from the drain filter;

a VOC venting valve provided to the fourth venting line;

an LVOC recovery line transferring a liquid discharged from the drain filter;

an LVOC recovery valve provided to the LVOC recovery line; and a fuel pressure measurement unit measuring a pressure in the fuel supply line, wherein the drain filter temporarily stores the inert gas and the LVOCs discharged from the fuel supply line, and the controller opens the VOC venting valve and the LVOC recovery valve when a pressure measurement value measured by the fuel pressure measurement unit reaches a preset value.

15. A vessel using VOCs as fuel and comprising the VOC fuel supply system according to claim 1.

* * * * *